United States Patent [19]

Grundy

[11] 3,868,548

[45] Feb. 25, 1975

[54] FAIL-SAFE TRANSISTORIZED OVERSPEED CIRCUIT ARRANGEMENT

[75] Inventor: Reed H. Grundy, Murrysville, Pa.

[73] Assignee: Westinghouse Air Brake Company, Swissvale, Pa.

[22] Filed: Jan. 23, 1974

[21] Appl. No.: 435,689

[52] U.S. Cl. .................... 317/5, 105/61, 180/105 E, 246/182 C

[51] Int. Cl. .......................................... G05d 13/62

[58] Field of Search .......... 317/5; 303/21 A, 21 CF, 303/21 P; 246/182 R, 182 B, 182 C; 105/61; 340/409, 410; 307/233; 318/369; 333/70 CR; 180/109 E

[56] References Cited

UNITED STATES PATENTS

| | | | |
|---|---|---|---|
| 3,041,449 | 6/1962 | Bingen | 246/182 B |
| 3,270,199 | 8/1966 | Smith | 246/182 B |
| 3,334,224 | 8/1967 | Allen et al. | 246/182 B |
| 3,504,362 | 3/1970 | Feldmann | 246/182 B |
| 3,651,765 | 3/1972 | Grundy | 105/61 |

FOREIGN PATENTS OR APPLICATIONS

| | | | |
|---|---|---|---|
| 1,560,448 | 3/1969 | France | 303/21 CG |

*Primary Examiner*—William H. Beha, Jr.
*Assistant Examiner*—Harry E. Moose, Jr.
*Attorney, Agent, or Firm*—J. B. Sotak; R. W. McIntire, Jr.

[57] ABSTRACT

This invention relates to a vital type of vehicle overspeed circuit arrangement for receiving variable frequency signals from a speed sensing device. The variable frequency signals are applied to a single break passive low-pass filter which attenuates the signals at a rate of 6db per octave. The attenuated signals are fed to an input amplifier which couples the amplified filtered signals to a selection network. The selection network includes a plurality of active switching stages a select one of which is activated for controlling the gain of a variable gain amplifier. The variable gain amplifier is coupled to an output amplifier which produces an output voltage having a value which is proportional to the frequency of the signals and the gain of the variable gain amplifier.

11 Claims, 2 Drawing Figures

FAIL-SAFE TRANSISTORIZED OVERSPEED CIRCUIT ARRANGEMENT

FIELD OF THE INVENTION

This invention relates to a fail-safe electronic circuit arrangement and more particularly to a vital type of vehicle overspeed circuit employing a low-pass filter for attenuating a.c. signals the frequency of which is proportional to the actual speed of the vehicle, an input amplifier for supplying the attenuated a.c. signals to a selection network having a plurality of active stages, a selected one of the plurality of the active stages supplies the a.c. signals to a variable gain amplifier the gain of which is determined by which one of the plurality of the active stages is selected, and an output amplifier supplied by the variable gain amplifier for producing an output which is a function of the actual speed of the vehicle and the gain of the variable gain amplifier.

BACKGROUND OF THE INVENTION

In various types of signal and communication systems for use in railroad and mass and/or rapid transit installations, it is conventional practice to utilize cab signals to control the speed of a vehicle or train of vehicles as it moves along its route of travel. Normally, the cab signals that are conveyed to the vehicle or train are in the form of coded carrier waveforms. That is, a carrier wave signal is selectively coded at one of a plurality of code or pulse rates. Each code or pulse rate signifies a given maximum speed at which a vehicle or train is permitted or authorized to travel along each particular block or section of trackway. In actual practice, the coded carrier signals are normally applied to the track rails and are picked up by inductive coils which are mounted forward of the front axle of the vehicle or train. The induced signals are amplified, demodulated, shaped and filtered, and then the recovered signals are applied to a decoder or decoding unit which controls the electrical state or condition of a plurality of decoding relays. One important and essential function to be carried out in a cab signaling operation is the ability for the carborne equipment to detect and sense overspeed conditions. When the actual speed of a moving vehicle or train exceeds the authorized speed permitted in a given track section or block area, an overspeed signal is immediately produced onboard a violating vehicle. Normally, this speed check is accomplished by the overspeed control portion of the car-carried cab signaling equipment. An axle driven tachometer in the form of a frequency generator produces signals which are proportional to the actual speed of the moving vehicle. Previously, the decoding relays completed a circuit path from the frequency generator through a selected one of a plurality of individual electrical filters in accordance with the last received speed command signal. It will be appreciated that the particular number of electrical filters was directly dependent upon the number of discrete speed commands utilized in the given cab signaling operation. Each of these electrical filters was normally made up of four sections with a separate isolation stage situated between each section. These former frequency filtering networks were very expensive to construct due to the excessive amount of electrical and magnetic material that was used and the numerous components that required assembling. The design of these previous filters resulted in further shortcomings in that individual adjusting of a multitude of components was required in order to maintain the necessary accuracy of these tuned circuits. In addition to their costliness and sensitiveness, the prior art filtering circuits were relatively large and bulking and therefore needed a considerable amount of mounting and storage area. Thus, it is apparent that the optimum type of circuits and apparatus for cab signaling equipment should be as simple as possible in construction in order to minimize initial purchase and subsequent maintenance costs and also to maximize space, weight and reliability considerations. Hence, it would be highly advantageous to alleviate the expensive, bulky and acutely sensitive filters in the overspeed decoding portion of the cab signaling apparatus and, in turn, to utilize cheap, small and substantially maintenance free electronic circuits in place thereof.

OBJECTS OF THE INVENTION

Accordingly, it is an object of this invention to provide a fail-safe electronic selection circuit arrangement for use in cab signaling apparatus for railroad and mass and/or rapid transit operations.

A further object of this invention is to provide a vital type of solid-state overspeed circuit arrangement having a multi-stage selection network coupled to an electronic amplifier for establishing its gain.

Another object of this invention is to provide a unique and novel speed sensing circuit having a single break point filter for attenuating a.c. signals which are fed to an input amplifier and which, in turn, are coupled to a selection network which has one of its switching stages activated for feeding a variable gain amplifier which in turn supplies an output amplifier.

Still another object of this invention is to provide a new and improved circuit arrangement having a low-pass filter for receiving variable frequency signals, an amplifier for feeding a selection circuit having a plurality of stages, one of the plurality of stages couples a variable gain amplifier to an output amplifier which is coupled to a level detector.

Still a further object of this invention is to provide a vehicle overspeed control circuit including means for receiving and filtering a.c. signals which have a frequency that is proportional to the actual speed of the vehicle, means for amplifying the filtered a.c. signals, selection means having a plurality of activate means one of which is activated in accordance with the speed command received by the vehicle, the selected active means is coupled to variable gain means having a gain set by the activated active means so that a.c. output signals having a predetermined value are produced and detected when the actual speed of the vehicle does not exceed the speed command and no critical and circuit failure is present.

Yet another object of this invention is to provide a fail-safe vehicle overspeed sensing circuit arrangement having a frequency generator for producing a.c. signals the frequency of which is proportional to the actual speed of the vehicle, a low-pass filter for filtering the a.c. signals, a decoding unit for decoding speed commands receiving onboard the vehicle, an input amplifier is coupled to the low-pass filter, a selection network having a plurality of switching stages is coupled to the input amplifier, a selected one of the plurality of switching stages couples the amplified filtered a.c. signals to a variable gain amplifier, the selected one of the plurality of switching stages establishes the gain of the variable gain amplifier, an output amplifier is coupled to the variable gain amplifier and produces an a.c. output that is level detected by a vital d.c. voltage make and level detector.

Yet a further object of this invention is to provide a vital type of electronic vehicular overspeed circuit which is simple in design, economical in cost, reliable in operation, durable in use and efficient in service.

SUMMARY OF THE INVENTION

In accordance with the present invention, the vital vehicle overspeed circuit arrangement includes a frequency generator for producing a.c. signals having a frequency which is proportional to the actual speed of the vehicle. The a.c. frequency signals are coupled to a single break point R-C low-pass filter which has a 20 dbs per decade characteristic for attenuating the a.c. signals. The low-pass filter is coupled to a common-base transistor amplifier. The output of the common-base transistor amplifier is coupled to a selection network which includes a plurality of individual controllable transistor switching stages. The conductive condition of the transistor switching stages are controlled by a speed command decoding unit which supplies negative operating potential to a selected one of the transistor switching stages in accordance with a particular speed command which the vehicle is authorized to travel in a given section. The selected transistor switching stage is coupled to a variable gain transistor amplifier. The gain of the variable gain transistor amplifier is determined by the value of the load resistor of the selected transistor switching stage. The variable gain transistor amplifier is coupled to the input of a common-collector transistor amplifier. The output signals of the common-collector transistor amplifier is connected to a vital voltage level detector which produces an output when and only when the output signals exceed a predetermined value and in the absence of any critical component or circuit failure.

BRIEF DESCRIPTION OF THE DRAWINGS

The foregoing objects and other attendant features and advantages of this invention will become more fully evident from the ensuing detailed description when considered in conjunction with the accompanying drawings wherein.

DESCRIPTION OF THE PREFERRED EMBODIMENT

Figures 1, 2:
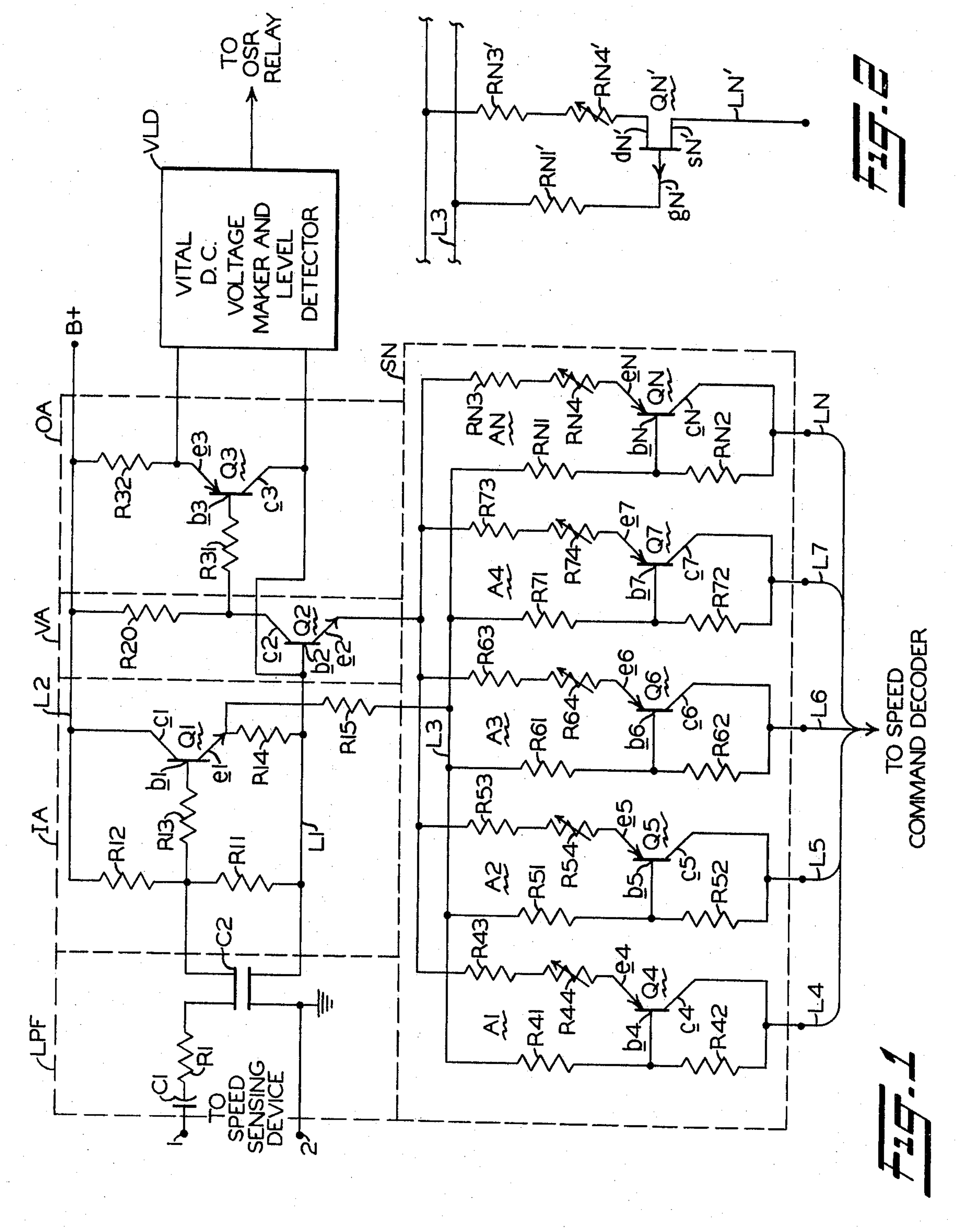
FIG. 1 is a schematic circuit diagram illustrating the preferred embodiment of the fail-safe vehicle overspeed circuit arrangement of the present invention.
FIG. 2 is a schematic circuit diagram of an alternate field effect transistor switching stage which may be used in the selection network in place of the transistor stage of FIG. 1.

Referring now to the drawings and in particular to FIG. 1, there is shown a portion of the vehicle overspeed control apparatus for a cab signaling system employing the vital or fail-safe electronic overspeed circuit arrangement of the present invention. As shown in FIG. 1, the fail-safe electronic circuit includes a low-pass filtering network LPF, an input amplifier IA, a selection network SN, a variable gain amplifier VA and an output amplifier OA which supplies a.c. voltage signals to a vital d.c. voltage make and level detector VLD that controls the conductive condition of vital type of electromagnetic overspeed relay OSR.

As shown, the low-pass filtering network LPF includes a basic filter circuit in the form of a single L or half section resistance-capacitance filter. A resistor R1 forms the resistive arm of the low-pass filter LPF while a four-terminal capacitor C2 forms the reactive arm of the low-pass filter LPF. As shown, one end of resistor R1 is connected via a coupling capacitor C1 to the upper terminal 1 of a pair of a.c. input terminals while the other end of the resistor R1 is directly connected to the upper plate of the four-terminal capacitor C2. The lower plate of capacitor C2 is directly connected to the other a.c. input terminal 2 which in this case is ground. Hence, a low-pass filter network is connected from input terminal 1 through isolation capacitor C1, through resistor R1 and through the four-terminal capacitor C2 to the input terminal 2. The a.c. input signals applied to terminals 1 and 2 are furnished by an appropriate car-carried signal producing means or speed sensing device, such as, an axle-driven frequency generator. The axle-driven generator produces signals having a frequency which is directly proportioned to the actual speed of the moving vehicle.

As shown, the other pair of terminals of the four-terminal capacitor C2 is connected to the input of semiconductive or solid-state amplifier IA. The input amplifier IA includes an active element, such as an NPN transistor Q1. The transistor Q1 includes an emitter electrode *e1*, a base electrode *b1* and a collector electrode *c1*. It will be noted that a voltage divider network including resistors R11 and R12 provides d.c. biasing voltages for the amplifying transistor Q1. That is, the lower end of resistor R11 is connected to common lead L1 while the upper end of resistor R12 is connected to the positive voltage terminal B+ of a suitable source of d.c. supply potential (not shown) via lead L2. The base electrode *b1* of transistor Q1 is connected by resistor R3 to the junction point of the voltage dividing resistors R11 and R12. The collector electrode *c1* of transistor Q1 is directly connected to the positive voltage lead L2. The emitter electrode *e1* of transistor Q1 is connected to common lead L1 via load resistor R14. The emitter electrode *e1* is also connected via resistor R15 to the selection network SN, the details of which will be described in detail hereinafter.

As shown, the variable gain amplifier VA includes a single active element in the form of an NPN transistor Q2. The transistor Q2 is arranged in a common-base configuration and includes an emitter electrode *e2*, a base electrode *b2* and a collector electrode *c2*. The base electrode *b2* is directly connected to common lead L1 while the emitter electrode *e2* is connected to selection network SW as will be described hereinafter. It will be noted that the collector electrode *c2* is connected to the positive lead L2 via collector load resistor R20. The output of transistor Q2 is derived from collector electrode *c2* which forms the input to the output amplifier OA.

The output amplifier OA includes a PNP transistor Q3 which is arranged in a common-collector configuration. The PNP transistor Q3 includes an emitter electrode *e3*, a collector electrode *c2* and a base electrode *b2*. As shown, the base electrode *b3* of transistor Q3 is coupled to the collector electrode *c2* of transistor Q2 by resistor R31. The collector electrode *c3* of transistor Q3 is directly connected to the common lead L1. The emitter electrode $e3$ of transistor Q3 is connected to the positive potential lead L2 via load resistor R32. The a.c. output signal developed on emitter electrode $e3$ of transistor Q3 are coupled to the input of the vital level detector and negative d.c. voltage maker VLD.

The vital negative d.c. voltage maker VLD may be of the type shown and described in Letters Patent of the U.S. No. 3,527,986, namely, the amplifier 9 and rectifier 21 which are depicted in FIG. 2*a* therein, and the level detector may be similar to the type shown and disclosed in Letters Patent of the U.S. No. 3,737,806 both patents of which are assigned to the assignee of the present application. It will be appreciated that the negative d.c. voltage maker is a fail-safe amplifier-rectifier network in which no conceivable circuit or component failure is capable of causing the existence of a negative d.c. voltage since no negative supply exists. Briefly, the amplifier 9 of FIG. 2*a* includes two transistor amplifier stages. The amplified output from the amplifier is applied to the fail-safe voltage rectifier and voltage doubling circuit which converts the a.c. signals into d.c. voltage. The negative d.c. output of the amplifier-rectifier is then applied to the input of the fail-safe level detector. The fail-safe level detector includes a feedback type of oscillator circuit and a voltage breakdown device. The oscillator employs a transistor amplifier and a frequency determining circuit which is interconnected with the voltage breakdown device for controlling the amount of regeneration and, in turn, the oscillating condition of the oscillator. In operation, the voltage breakdown device normally exhibits a high dynamic impedance and only assumes a low dynamic impedance when a sufficient d.c. voltage causes the device to break down and conduct. Thus, the oscillating circuit will only produce a.c. oscillations when the d.c. voltage exceeds a predetermined amplitude, namely, the zener threshold value, so that the breakdown device conducts and exhibits a low impedance. Under this condition, the oscillator is provided with sufficient regenerative feedback so that oscillations occur. These oscillations are again converted to d.c. voltage by another d.c. voltage maker. Thus, a vital d.c. voltage will be available for energizing an appropriate vital device, such as an overspeed control relay OSR. It will be appreciated that a front contact is normally closed due to the energization of the overspeed relay OSR. Thus, during normal operation the control circuit to the service braking apparatus is completed and the brakes are released. As will be described in detail hereinafter, the front contact is released by the deenergization of the overspeed control relay OSR which results in the interruption of the service brake control circuit. Accordingly, the brakes will be applied where the overspeed relay OSR is deenergized so that the speeding vehicle is brought under control and will begin to decelerate.

Returning now to the above-mentioned selection network SN, it will be seen that network SN is made up of a plurality of active switching stages A1, A2, A3, A4 and AN. As shown, each of the active stages includes similar components, such as, a number of fixed resistors, a variable resistor and a semiconductor device. The first active switching stage A1 includes a PNP transistor Q4 having an emitter electrode $e4$, a collector electrode $c4$ and a base electrode $b4$. A voltage divider including series connected resistors R41 and R42 is connected between lead L3 which is common to resistor R15 and lead L4 the latter being selectively connected to a suitable source of negative operating potential, as will be described in detail hereinafter. The collector electrode $c4$ of transistor Q4 is directly connected to lead L4 while the emitter electrode $e4$ is connected by load resistor R43 and variable resistor R44 to the emitter electrode $e2$ of transistor Q2. The second stages A2 of the selection network SN also includes a PNP transistor Q5 having an emitter electrode $e5$, a collector electrode $c5$ and a base electrode $b2$. The base electrode $b5$ is connected to the junction point of the voltage divider formed by series connected resistors R51 and R52. The collector electrode $c5$ is directly connected to selectively controlled potential lead L5 while the emitter electrode $e5$ is connected to emitter electrode $e2$ of transistor Q2 via load resistor R53 and variable resistor R54. Similarly, the third active stage A3 includes a PNP transistor Q6 having an emitter electrode $e6$, a collector electrode $c6$ and a base electrode $b6$. A voltage divider including resistors R61 and R62 is connected between common lead L3 and controlled potential lead L6. The base electrode $b6$ is connected to the junction point of resistors R61 and R62. The collector electrode $c6$ is directly connected to the controlled negative potential lead L6 while the emitter electrode is connected to lead L3 via load resistor R63 and variable resistor R64. The fourth switching stage A4 includes a PNP transistor Q7 having an emitter electrode $e7$, a collector electrode $c7$ and a base electrode $b7$. The base electrode $b7$ is connected to the junction point of the voltage divider formed by series resistors R71 and R72. Resistor R71 is connected to common lead L3 while resistor R72 is connected to the negative potential lead L7. The collector electrode $c7$ is directly connected to lead L7 while the emitter electrode $e7$ is connected by fixed load resistor R73 and variable resistor R74 to the emitter electrode $e2$ of transistor Q2. The final active stage, in this case the fifth stage AN includes a PNP transistor QN including an emitter electrode $e$N, a collector electrode $c$N and a base electrode $b$N. The base electrode $b$N is connected to the junction point of series connected resistors RN1 and RN2 which, in turn, are connected to common lead L3 and negative potential lead LN, respectively. The collector electrode $c$N is directly connected to the negative potential lead LN while the emitter electrode $e$N is connected to lead L3 via fixed load resistor RN3 and variable resistor RN4.

Let us assume that the resistance value of resistors R43, R53, R63, R73 and RN3 have been chosen to be progressively less in value. For example, the resistance of resistor R43 is more than that of resistor R53, the resistance of R53 is more than that of resistor R63, the resistance value of resistor R63 is more than the resistance of resistor R73 and the resistance of resistor R73 is more than the resistance value of resistor RN3. In addition, it has been found advantageous and convenient to select the values of the load resistors R43–R44, R53–R54, R63–R64, R73–R74 and RN3–RN4 to be a function of the overspeed points which may be for the purpose of discussion be 15, 30, 45, 60 and 75 mph, respectively. As previously mentioned, the respective switching stages are activated by a vehicle-carried speed command decoder.

It is understood that the coded cab signals are picked up from the track rails by inductive pickup means or coils and are demodulated, amplified, shaped, limited and decoded by the cab signal equipment. The speed command decoder of the cab signal equipment includes a plurality of code filters and negative d.c. makers which are energized or deenergized in accordance with the code rate or frequency of the various received coded cab signals. Thus, a negative d.c. voltage will appear on a select one of the leads L4, L5, L6, L7 or LN in accordance with the electrical condition of its associated code filter. That is, the energization of the associated level detector and negative d.c. maker of the speed command decoder will be applied to only one of the plurality of control leads L4, L5, L6, L7 or LN and therefore a negative d.c. voltage will be supplied to one of the switching stages A1, A2, A3, A4 or AN. It will be understood that the number of switching stages and d.c. controlled leads may be greater or lesser than the number shown depending upon the number of speed commands used in any given cab signaling system.

It will be appreciated that the gain of the variable gain amplifier VA is a function of the collector load resistor divided by the effecting emitter resistance of transistor Q2. That is, the gain A of the amplifying circuit VA is varied by the speed command decoder in accordance with which one of the code filter outputs is energized and furnishes a negative d.c. supply or operating potential to one of the leads L4, L5, L6, L7 or LN. Hence, with negative d.c. voltage supplied to lead L4, the gain of amplifier VA is R20/R43+R44 since the effective emitter resistance of transistor Q2 is R43 plus R44 when transistor Q4 is rendered conductive. It will be appreciated that resistor R44 as well as R54, R64, R74 and RN4 allow for a small adjustment that is normally required due to the manufacturing tolerances of resistors R43, R53, R63, R73 and RN3. Under this assumed condition, the other switching stages A2, A3, A4 and AN are dormant since transistors Q5, Q6, Q7 and QN are inactive and nonconducting due to the absence of the necessary negative d.c. operating potential on leads L5, L6, L7 and LN, respectively. It will be understood that the gain of the amplifier VA is R20/R53+R54 when transistor Q5 is rendered conductive by application of negative d.c. operating potential on lead L5. In a like manner, the gain is equal to R20/R63+R64, R20/R73+R74, and R20/RN3+RN4 when switching transistors Q6 and Q7 and QN are rendered conductive by the appearance of negative operating potential on leads L6, L7 and LN, respectively. As previously mentioned, it is understood that only one of the code filters of the speed command decoders is energized at any given time so that only one of the leads L4, L5, L6, L7 or LN has negative voltage appearing thereon at any given time.

Turning now to the operation of the present invention, it will be assumed that all the components and elements are intact that the overspeed sensing circuit and that the entire cab signaling apparatus is operating properly. Further, it will be assumed that the present code rate being received onboard the vehicle is effective in energizing the appropriate code following relay of the speed command decoder for applying negative d.c. operating potential on lead L4. As mentioned above, it will be understood that only one of the decoding relays may be energized at any given time so that under the assumed condition no operating potential is available on leads L5, L6, L7 and LN. Thus, under this assumed condition the transistor Q4 is switched on and the resistors R43 and R44 are effectively the emitter load resistance of amplifying transistor Q2. Hence, the gain of amplifier VA is equal to R20/R43+R44. As mentioned above, the speed of the vehicle is constantly being measured and sensed so that a.c. input signals from the axle driven frequency signal generator are being supplied to input terminals 1 and 2. The a.c. signals are coupled to the low-pass filter LPF formed by resistor R1 and capacitor C2 via coupling capacitor C1. It will be appreciated that the voltage frequency response characteristic of the low-pass filter circuit LPF has been chosen to result in a single break point curve. The break point occurs at a frequency $f$ of $1/2\pi R1C2$ which is the half power point where $R1 = 1/WC2$ so that low-pass filter will thereafter attenuate signals at a rate of approximately 6 dbs per octave or, in other words, 20 dbs per decade. It will be appreciated that when linear operation is required the first or low speed point should be located substantially beyond the break point of the curve. That is, the frequency response curve of the R-C filter is initially flat or level so that substantially all of the low frequency voltage signals are passed but the higher frequency signals that are produced by the axle driven tachometer or frequency generator are attenuated. Thus, the a.c. signals passed by filter VA are applied to the input of the amplifier IA. The amplified signals are taken from the emitter $e1$ of transistor Q1 and are coupled to lead L3 via resistor R15. With the negative d.c. operating potential on lead L4 the transistor Q4 is turned on so that the amplified a.c. input signals applied to base electrode $b4$ are reproduced on the emitter electrode $e4$. By selecting an appropriate value of resistor R43 and trimming by the variable resistor R44, it is possible to control the amount of current that is injected into the emitter electrode $e2$ of transistor Q2 and, in turn, the amount of current that flows through collector load resistor R20. As previously mentioned, the amount of amplification is dependent upon the particular gain which in this present instance is set at R20/R43+R44 by actuation of the switching stage A1 by the speed command decoder. The a.c. signals developed on collector electrode $c2$ are in turn applied to the input of output amplifier OA. The amplified a.c. signals are applied to the vital d.c. voltage maker and level detector VLD which amplifies, rectifies and detects the amplitude of the signals. In cases where the actual speed of the vehicle is equal to or less than the given speed command, the output of the level detector is employed to energize a vital overspeed relay OSR. As mentioned above the overspeed relay controls at least one front contact which remains closed so long as the relay is picked up. Hence, the electrical circuit to the brake control apparatus is completed so that the application of the brakes is normally precluded when the actual speed of the vehicle is below the last received speed command signal, which in the instance case is the most restrictive speed when switching stage A1 is activated by speed command decoding unit. It will be seen that as the speed of the vehicle increases the frequency of the a.c. signals produced by the axle driven generator increase proportional so that a greater amount of attenuation is exhibited by the filter network LPF. In the present case, the operating point on the voltage frequency response curve, which is the most restrictive speed, is selected such that the amplitude of attenuated signals when multiplied the gain of the variable gain amplifier VA will result in an output signal which is less than the zener threshold of breakdown voltage so that no output is produced by the level detector VLD. That is, the gain established by the activation of switching stage A1 is sufficient to offset the attenuation of low-pass filter LPF when the actual speed and in turn the frequency of the input signals do not exceed the selected most restrictive operating point on the voltage frequency response curve. When the actual speed and in turn the frequency of the input signals exceeds the selected point on the response curve, the output signals developed on the emitter electrode *e*3 of transistor amplifier Q3 will result in insufficient d.c. voltage for breaking down the zener diode, and thus no output is available at the level detector. The lack of an output voltage at the level detector causes the deenergization of the OSR relay and the opening of its front contact. The opening of the front contact interrupts the circuit path to the brake control apparatus so that automatic application of the brakes occurs and the vehicle begins to slow down. It will be understood that the overspeed relay will remain deenergized and its front contact will remain opened so long as the frequency of the signal produced by the tachometer is above the frequency of the selected most restrictive operating point on the voltage frequency curve. Thus, an overspeed condition is readily recognized by the presently described circuit so that the vehicle is under positive control at all times.

It will be seen that when the speed command decoder receives one of the other speed command signals, the operating potential will be removed from lead L4 and a negative d.c. operating potential will appear on one of the leads L5, L6, L7 or LN so that one of the other switching stages A2, A3, A4 or AN will become activated. The authorized speeds become progressively less resistive with the actuation of stages A2, A3, A4 and AN with the switching stage AN becoming the least restrictive speed command. However, the gain of the stages A2, A3, A4 and AN becomes progressively higher since the attenuation of the low-pass filter is progressively higher as the frequency of the input signal increases. Thus, the amplitude of the a.c. signals are linearly decreased at a rate of 6 dbs per octave. Hence it will be observed that the higher the frequency the lower the signal level and the need for greater gain is required at progressively higher speeds.

It will be appreciated that whenever the output voltage at emitter electrode *e*3 of amplifying transistor Q3 is less than the detection voltage level of the zener diode, an overspeed condition is assumed to be present. Accordingly, in order to satisfy the negative d.c. voltage maker and level detector for higher speeds or frequencies, it is necessary to employ successively higher gain stages. Thus, the gain R20/R53+R54 of stage A2 is greater than gain R20/R43+R44 of stage A1 the gain R20/R63+R64 of stage A3 is greater than gain R20/R53+R54 of stage A2, the gain R20/R73+R74 of stage A4 is greater than gain R20/R63+R64 of stage A3 and the gain R20/RN3+RN4 is greater than gain R20/R73+R73 of stage A4. As previously mentioned, while five distinct speed commands have been shown and described, it will be appreciated that a greater or less number of speed commands may be used in practicing the present invention. In addition, it will be appreciated that the emitter load resistors of the switching stages may or may not be multiples of each other depending upon the command speeds that are required by the particular speed command system.

Additionally, it will be observed that the overspeed circuit arrangement operates in a fail-safe manner in that no critical circuit or component failure is capable of increasing the established gain of any of the collector load resistor R20 divided by the emitter resistance combinations, namely the sum of the fixed and adjustable resistors R43 plus R44, etc., of the switching stages. It will be appreciated that it is of paramount importance to utilize certain well founded postulates in regard to the design of the circuit and to the selection of components. The circuit is meticulously designed and laid out to ensure that leads in proximity to each other are incapable of engaging each other to create a short circuit condition. In addition, any critical resistor in the circuit is preferably constructed of a carbon composition so that it is incapable of becoming short circuited. The purpose of using a four-terminal capacitor C2 is to ensure that the loss of one or more leads does not result in an unsafe condition. Further, it will be noted that failure of any of the other passive elements as well as the active components results in the elinination of the necessary biasing and operating potentials or destroys the amplifying characteristics of the transistors so that an unsafe condition will not occur.

Referring to FIG. 2, there is shown a schematic circuit diagram of an alternate embodiment of a field-effect transistor switching stage that may be substituted for the bi-polar transistor switching stages of FIG. 1. The switching stage of FIG. 2 includes a field-effect transistor QN′ having an output or drain element *d*N′, an input or source element *s*N′ and a P-type gate element *g*N′. As shown, the gate *g*N′ is coupled to lead L3 via resistor RN′. The drain *d*N′ is connected to a fixed resistor RN3′ and an adjustable resistor RN4′ which in turn are connected to the emitter electrode *e*2 of transistor Q2 (not shown). The source element *s*N′ is directly coupled to a lead LN′ to which negative d.c. operating potential may be selectively controlled by the speed command decoder as previously described. The field-effect transistor switching stage operates in a similar manner as the stages in FIG. 1 and may be directly substituted therefore to selectively control the gain of the variable gain amplifier VA.

It will be appreciated that while the present invention finds particular utility in cab signaling equipment and, in particular to speed command control apparatus, it is understood that the invention may be employed in other equipment and apparatus which have need of the unique operation.

Further, it will be quite evident that this invention may be utilized in various other systems and apparatus, such as, security circuits and apparatus or the like which require the vitality and safe operation inherently present in this invention.

In addition, it will be understood other changes, modifications and alterations may be made without departing from the spirit and scope of this invention. For example, the complement of the transistors shown and described may be used simply by changing the polarity of the operating and supply voltages. Further, it will be appreciated that other types of switching stages and active elements and d.c. makers and level detectors may be employed in practicing this invention. Thus, it is understood that the showing and description of the present invention should be taken in an illustrative and diagrammatic sense only.

Having now described the invention, what I claim as new and desire to secure by Letters Patent is:

1. A vital circuit arrangement comprising, a selection network having a plurality of active stages only one of which is activated at any given time, a source of variable frequency signals, a low-pass filter for attentuating the signals so that the amplitude is proportional to the frequency of the signals, an input amplifier supplying the attentuated signals to said active stages of said selection network, a variable gain amplifier having the signals supplied by the activated one of said plurality of active stages of said selection network, and an output amplifier connected to said variable gain amplifier for producing an output which is a function of the amplitude of signals and the gain of the variable amplifier.

2. A vital circuit arrangement as defined in claim 1, wherein said low-pass filter includes a resistive and capacitive means forming a single break point filter.

3. A vital circuit arrangement as defined in claim 2, wherein said capacitive element is a four-terminal capacitor.

4. A vital circuit arrangement as defined in claim 1, wherein each of said active stages includes a semiconductive device and a load impedance.

5. A vital circuit arrangement as defined in claim 4, wherein the value of said load impedance of each of said active stages is selected in accordance with the amplitude of the attenuated a.c. signals passed by said low-pass filter.

6. A vital circuit arrangement as defined in claim 1, wherein said variable gain amplifier includes a common-base transistor stage.

7. A vital circuit arrangement as defined in claim 6, wherein a selected one of a plurality of load impedances is effectively coupled to the emitter electrode of said transistor stage to establish the gain of said variable gain amplifier.

8. A vital circuit arrangement as defined in claim 4, wherein said semiconductive device is a bipolar junction transistor.

9. A vital circuit arrangement as defined in claim 4, wherein said semiconductive device is a field-effect transistor.

10. A vital circuit arrangement as defined in claim 1, wherein the activated one of each of said active stages of said selection network varies the gain of said variable gain amplifier.

11. A fail-safe vehicle overspeed sensing circuit comprising, means for generating a.c. signals proportional to the actual speed of the vehicle, filter means for receiving and filtering the a.c. signals, decoding means for decoding speed commands received onboard the vehicle, selection means having a one of a plurality of control stages activated by said decoding means, input amplifying means for amplifying and supplying the filtered a.c. signals to said selection means, a variable gain amplifying means coupled by the activated one of the plurality control stage to establish a predetermined gain, and an output amplifying means coupled to said variable gain amplifying means and producing an amplified output which is coupled to a d.c. voltage maker and level detector to provide an output signal only when the actual speed of the vehicle is below the last received authorized speed command.

* * * * *